US011938494B2

(12) United States Patent
Nagao et al.

(10) Patent No.: US 11,938,494 B2

(45) Date of Patent: Mar. 26, 2024

(54) NOZZLE

(71) Applicant: SUGINO MACHINE LIMITED, Uozu (JP)

(72) Inventors: Takeru Nagao, Uozu (JP); Tomio Sawasaki, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 130 days.

(21) Appl. No.: 17/323,172

(22) Filed: May 18, 2021

(65) Prior Publication Data

US 2021/0362169 A1 Nov. 25, 2021

(30) Foreign Application Priority Data

May 25, 2020 (JP) ................................ 2020-090817

(51) Int. Cl.

*B05B 1/34* (2006.01)

*B05B 1/10* (2006.01)

*B05B 1/14* (2006.01)

(52) U.S. Cl.

CPC .............. *B05B 1/3402* (2018.08); *B05B 1/10* (2013.01); *B05B 1/14* (2013.01)

(58) Field of Classification Search

CPC ............ B05B 1/3402; B05B 1/10; B05B 1/14

USPC ... 239/468, 536, 548, 554, 565, 589, 533.12

See application file for complete search history.

(56) References Cited

U.S. PATENT DOCUMENTS 2,484,577 A * 10/1949 Murphy ................ B05B 1/3426 239/468

4,284,243 A 8/1981 Shaner 5,931,392 A 8/1999 Adams 5,934,571 A * 8/1999 Schmidt ............ F02M 61/1833 239/533.12

6,322,617 B1 11/2001 Wurz et al.

6,644,565 B2 * 11/2003 Hockenberger ... F02M 61/1833 239/533.12

(Continued)

FOREIGN PATENT DOCUMENTS

| | | |
|---|---|---|
| CN | 103736607 B | 4/2016 |
| FR | 2293252 A1 | 7/1976 |

(Continued)

OTHER PUBLICATIONS

Office Action dated Oct. 6, 2020 in a corresponding Japanese Patent Application No. 2020-090817 (3pages).

(Continued)

*Primary Examiner* — Steven J Ganey

(74) *Attorney, Agent, or Firm* — United IP Counselors, LLC

(57) ABSTRACT

Turbulence of the jet ejected from the nozzle hole is suppressed. The nozzle includes a shaft body having a center axis, a liquid guide path located inside the shaft body and extending along the center axis, a liquid chamber disposed at a distal end portion of the liquid guide path the liquid chamber having a nozzle hole. The nozzle hole is located at the distal end portion of the liquid chamber, extending along the ejection axis that extends in a direction different from the center axis. The nozzle has an inlet portion having a smaller diameter toward the downstream, and a guide portion connected to the downstream of the inlet portion to guide the liquid to an opening.

15 Claims, 8 Drawing Sheets

(56) References Cited

U.S. PATENT DOCUMENTS

| | | | | |
|---|---|---|---|---|
| 7,175,109 | B2 * | 2/2007 | Schroeder | B05B 1/14 239/548 |
| 9,562,503 | B2 * | 2/2017 | Hijima | F02M 61/10 |
| 9,677,526 | B2 * | 6/2017 | Yasukawa | F02M 51/0671 |
| 2013/0270369 | A1 * | 10/2013 | Peters | F02M 61/1866 239/533.2 |
| 2016/0040505 | A1 | 2/2016 | Stowe, II | |

FOREIGN PATENT DOCUMENTS

| | | |
|---|---|---|
| JP | S52-034764 B2 | 9/1977 |
| JP | S62-033570 A | 2/1987 |

OTHER PUBLICATIONS

Extended European Search Report dated Oct. 22, 2021 in a corresponding European Patent Application No. 21172534.6 (10 pages).

* cited by examiner

NOZZLE

CROSS-REFERENCE TO RELATED APPLICATIONS

This application claims the benefit of priority to Japanese Patent Application No. 2020-090817, filed on May 25, 2020, the entire contents of which are hereby incorporated by reference.

BACKGROUND

1. Technical Field

The present invention relates to a nozzle.

2. Description of the Background

A conventional nozzle includes a nozzle body extending in the longitudinal direction, two guide grooves located inside the nozzle body, and two ejection holes for removing the deposits by jet (Chinese Patent No. 103736607).

BRIEF SUMMARY

In the conventional nozzle, the jet ejected from the nozzle hole may be turbulent.

An object of the present invention is to suppress turbulence of the jet ejected from the nozzle hole.

A first aspect of the present invention provides a nozzle, including:

a shaft body having a center axis;

a liquid guide path located inside the shaft body, the liquid guide path extending along the center axis;

a liquid chamber disposed at a distal end portion of the liquid guide path, the liquid chamber having a nozzle hole located at a distal end portion of the liquid chamber, the nozzle hole extending along an ejection axis that is different direction from the center axis, the nozzle hole having an inlet portion connected to the liquid chamber, the inlet portion having a smaller diameter toward the downstream, and a guide portion connected to the downstream of the inlet portion to guide liquid to an opening.

The liquid is, for example, an aqueous cleaning liquid. The pressure of the liquid is, for example, 1.5 MPa to 200 MPa. The cleaning includes deburring by high pressure jets. The deposit is, for example, chips, or oil content.

The shaft body has, for example, a substantially cylindrical shape. The outlet plane may be provided with a cut-out on the shaft body. The outlet plane may be provided on the shaft body at equal intervals in the circumferential direction.

The liquid guide path has, for example, substantially cylindrical shape. The liquid guide path may be a cylinder having a larger cross-sectional area than the liquid chamber. The liquid guide has an inner diameter of 3 to 10 times as the opening. The liquid guide has a length of 10 to 300 times as the opening. The liquid chamber has, for example, a straight columnar shape. The liquid chamber has a cross-sectional shape of, for example, a circle, a fan, a semicircle, or isosceles trapezoidal shape. Preferably, the bottom of the liquid chamber is planar. The bottom portion of the liquid chamber may have a convex portion. The convex portion may be a convex shape toward the basal end side at the center, or a convex shape toward the distal end side at the center. The convex portion is, for example, a hemispherical surface or a conical shape. The inlet plane may be provided on the liquid chamber at equal intervals in the circumferential direction. The liquid chamber has an inner diameter of 2 to 8 times as the opening. For example, the liquid chamber has a length of 5 to 90 times as the opening.

The ejection axis is the center line in the design of the jet. The ejection axis is spaced apart from the bottom of the liquid chamber. The ejection axis is preferably arranged at a distance from the bottom of the liquid chamber by at least the opening diameter. The opening diameter may be 0.5 to 2.5 mm. Here, the distance between the ejection axis and the bottom of the liquid chamber is referred to as a height of the ejection axis. The ejection axis preferably intersects the center axis of the shaft body. The ejection axis may be disposed inclined in a basal or distal direction with respect to the center axis of the shaft body. The ejection axis may be orthogonal to the center axis of the shaft body.

When the ejection axis is perpendicular to the center axis of the shaft body and the height of the ejection axis is less than 0.5 times the opening diameter, the flux distribution of the liquid flowing into the opening is biased toward the basal end of the nozzle. As a result, the liquid ejected from the opening becomes asymmetric, and the jet deflects in the direction of the nozzle axis and diffuses. On the other hand, when the height of the ejection axis is more than twice the opening diameter, vortices are likely to be generated in the liquid chamber at a distal end side than at the opening. When the structure of the liquid flow in the liquid chamber is disturbed, the structure of the flow inside the jet ejected from the opening is disturbed and the liquid diffuses. Therefore, preferably, the height of the ejection axis is 0.5 to 2 times the opening diameter.

The nozzle holes are spaced apart from the bottom of the liquid chamber. The nozzle hole is preferably located close to the bottom of the liquid chamber. The nozzle hole is spaced at least a length from the bottom of the liquid chamber by the diameter of the opening. The nozzle hole has a circular cross-sectional view having a center at the ejection axis. The inlet portion has a smaller diameter toward the downstream side. The inlet portion has, for example, a circular lateral cross-section, and has a convex curved longitudinal cross-section toward the radially inward. The inlet portion may be, for example, a truncated conical shape.

The apex angle of the inlet portion, which has a truncated conical shape, is from 10 degrees to 60 degrees (inclusive), and preferably from 20 degrees to 50 degrees (inclusive). The length of the inlet portion is one-third to one-half of the opening diameter. Here, the length of the inlet portion is the distance from the point where the upstream end of the inlet portion is connected to the liquid chamber to the point where the downstream end of the inlet portion is connected to the guide portion. The guide portion is a cylinder having a center at the ejection axis. The length of the guide portion is 1.25 to 3 times (inclusive) the length of the inlet portion. Here, the length of the guide portion is the distance from the point where the upstream end of the guide portion is connected to the inlet portion to the point where the downstream end of the guide portion is connected to the outer surface of the shaft body. The opening may be provided in a notched manner on the shaft body. The opening may expand toward the downstream.

The guide portion gradually changes the cross-sectional area of the flow path from the liquid chamber to the nozzle hole to suppress the turbulence of the liquid flow in the guide portion. When the apex angle is less than 10 degrees or more than 60 degrees, the cross-sectional area greatly changes. By passing through the guide portion, the liquid flow is regulated by the wall effect. The inlet portion having too long length shortens the length of the guide portion, thus the turbulence of the fluid inside the nozzle hole is likely to remain. Further, when the inlet portion having too short length greatly changes the cross-sectional area, thus the turbulence of the fluid is greatly disturbed.

A plurality of nozzle holes may be disposed in a position that is symmetric with respect to the center axis of the shaft body. The ejection axes of the plurality of nozzle holes may each intersect on the same plane.

A plate, which is disposed at the bottom of the liquid chamber, extends along the center axis of the shaft body. The plate length is, for example, 1 to 6 times (inclusive) the opening diameter, and preferably 2 to 4 times (inclusive) the opening diameter. Here, the plate length is a length from the upper end of the plate to the bottom of the liquid chamber. The plate width is, for example, a length of quarter to one-eighth (inclusive) the diameter of the liquid chamber, and preferably a length of one-fifth to one-sixth (inclusive) the diameter of the liquid chamber. Here, the plate width is the length of the plate in the radial direction of the liquid chamber.

The plate partitions the liquid chamber into two chambers. The plate having a length equal to or less than 1 times the opening diameter causes the liquid flow in the liquid chamber to be disturbed. The plate having a length less than twice the opening diameter reduces the separation effect. The plate having a length exceeding 4 times the opening diameter has less rectifying effect for the increase of the plate length compared with the plate having a length less than 4 times. The plate having a length 6 times or more the opening diameter has small rectifying effect by the plate. On the other hand, longer plate length reduces the effective cross-sectional area of the entire nozzle. The wider plate width reduces the effective cross-sectional area of the nozzle. Preferably, the plate width is thin. The plate partitions the liquid chamber into a plurality of liquid chambers, each of which has an equal cross-sectional area. For example, the plate partitions the liquid chamber into a first liquid chamber and a second liquid chamber in a line symmetric manner with respect to the axis of the shaft body. The first liquid chamber and the second liquid chamber each has a single nozzle hole.

The nozzle according to the present invention is capable of suppressing the turbulence of the jet.

DETAILED DESCRIPTION

First Embodiment

Figure 1:
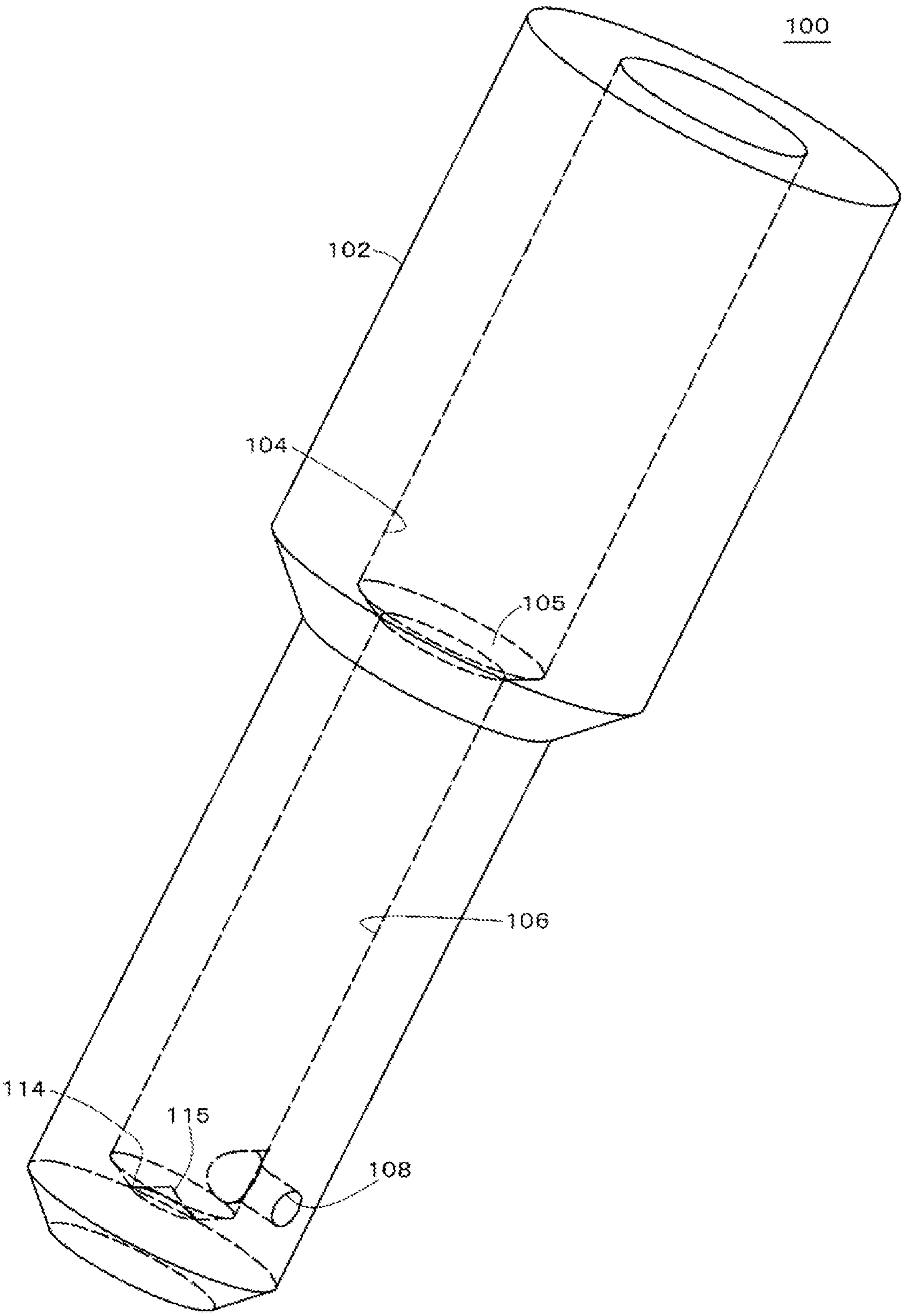
FIG. 1 is a perspective view of nozzle according to a first embodiment.
Figure 2:
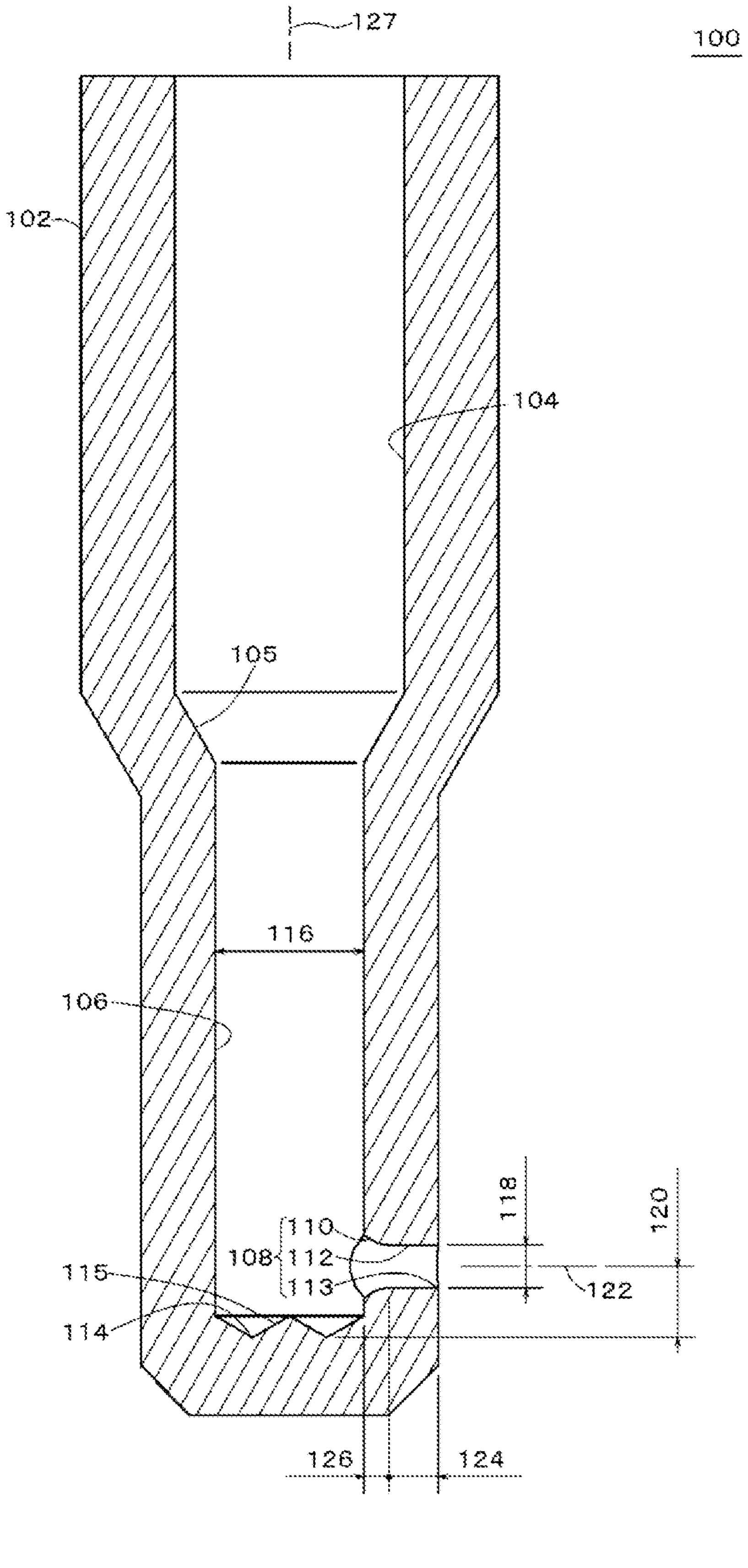
FIG. 2 is a longitudinal sectional view of the nozzle according to the first embodiment.

As shown in FIGS. 1 and 2, the nozzle 100 according to the present embodiment includes a shaft body 102, a liquid guide path 104, a liquid chamber 106, and a nozzle hole 108.

The shaft body 102 extends along a shaft center axis (center axis) 127. The shaft body 102 is a stepped cylinder. The shaft body 102 has a basal end portion having a larger diameter than a distal end portion. For example, the basal end portion of the shaft body 102 has an outer diameter of 6 mm to 12 mm.

The liquid guide path 104, which is disposed inside the shaft body 102, extends along the center axis 127. The liquid guide path 104 has a circular cross-section. The liquid guide path 104 has a reduced diameter portion 105. The reduced diameter portion 105, which is located at a distal end of the liquid guide path 104, is a conical shape that decreases in diameter toward the downstream. For example, the liquid guide path 104 has an inner diameter of 4 mm to 10 mm. For example, the liquid guide path 104 has a length of 50 mm to 300 mm.

The liquid chamber 106, which is connected to the reduced diameter portion 105, extends along the center axis 127. The liquid chamber 106 has a cylindrical shape. The liquid chamber 106 has a diameter smaller than the liquid guide path 104. The liquid chamber 106 has a bottom portion 114 at a downstream end. The bottom portion 114 includes a convex portion 115 formed in a conical shape toward the basal end direction. For example, the liquid chamber 106 has an inner diameter of 2 mm to 5 mm. The liquid chamber 106 has a length of 40 mm to 100 mm.

The nozzle hole 108 is located at the distal end portion of the liquid chamber 106. The nozzle hole 108 extends along an ejection axis 122. The nozzle hole 108 has a circular cross-section having a center at any location of the ejection axis 122. The nozzle hole 108 has an inlet portion 110, a guide portion 112, and an opening 113. An axial height 120 is equal to an opening diameter 118. For example, the opening diameter 118 is 0.9 mm to 1.3 mm.

The inlet portion 110 is connected to the liquid chamber 106. The inlet portion 110 does not contact the bottom portion 114. The inlet portion 110 has a shape having a smaller diameter toward the downstream. The inlet portion 110 has, for example, a truncated conical shape. A length 126 of the inlet portion is, for example, one-third of the opening diameter 118.

The guide portion 112 is located the downstream of the inlet portion 110. The guide portion 112 is cylindrical. The length 124 of the guide portion is, for example, 1.25 times the length 126 of the inlet portion.

The opening 113 is an opening located on the outer surface of the shaft body 102.

The liquid flowing into the nozzle 100 passes through the liquid guide path 104, the liquid chamber 106, and the nozzle hole 108, and is ejected from the opening 113. The nozzle 100 produces a linear jet. The inlet portion 110 gradually reduces the diameter from the liquid chamber 106 toward the guide portion 112. As a result, the turbulence of the streamlines due to the rapid reduction in the diameter of the nozzle hole 108 is suppressed to improve the linearity of the jet.

Second Embodiment

Figure 3:
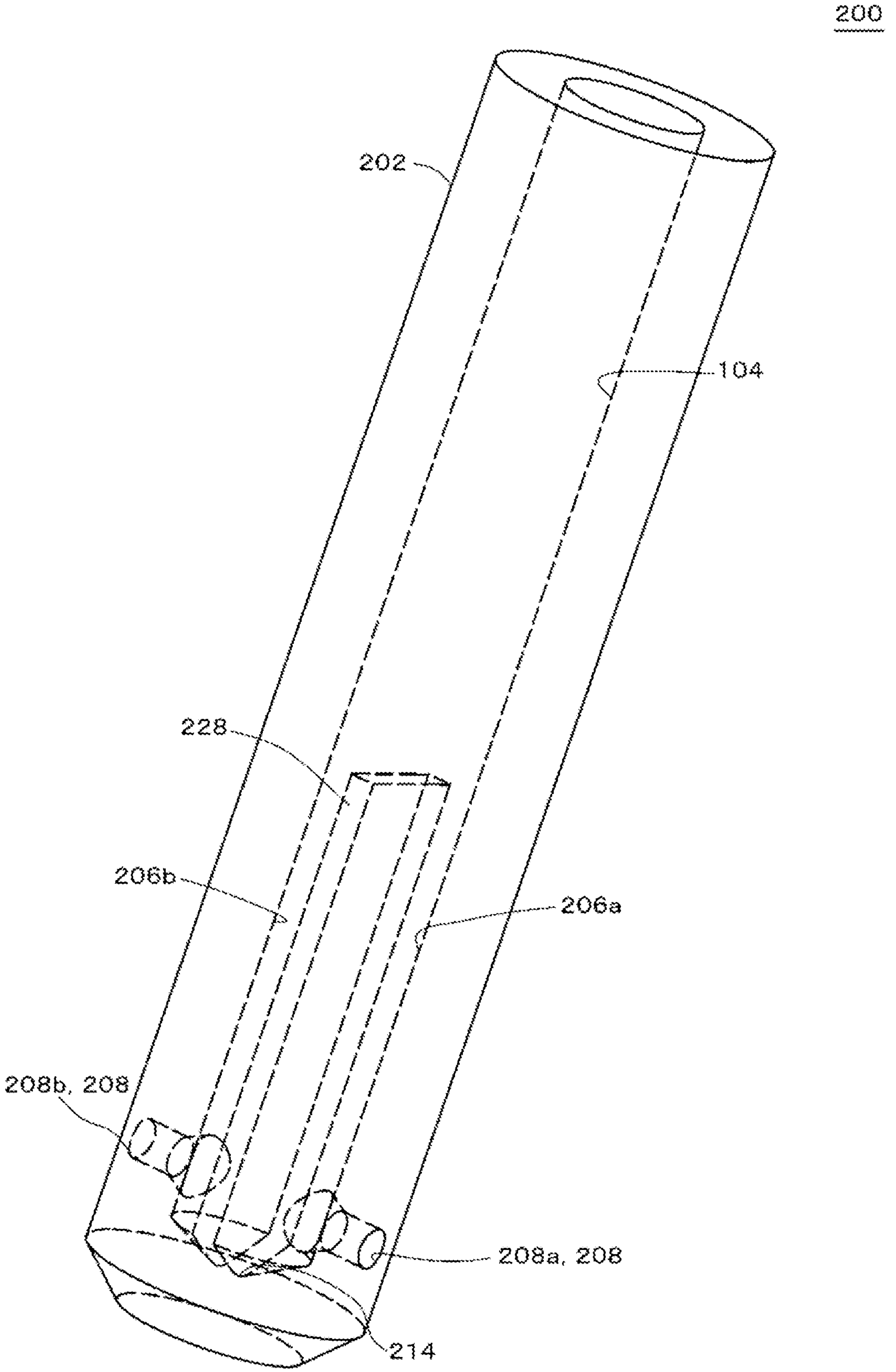
FIG. 3 is a perspective view of the nozzle according to the second embodiment.
Figure 4:
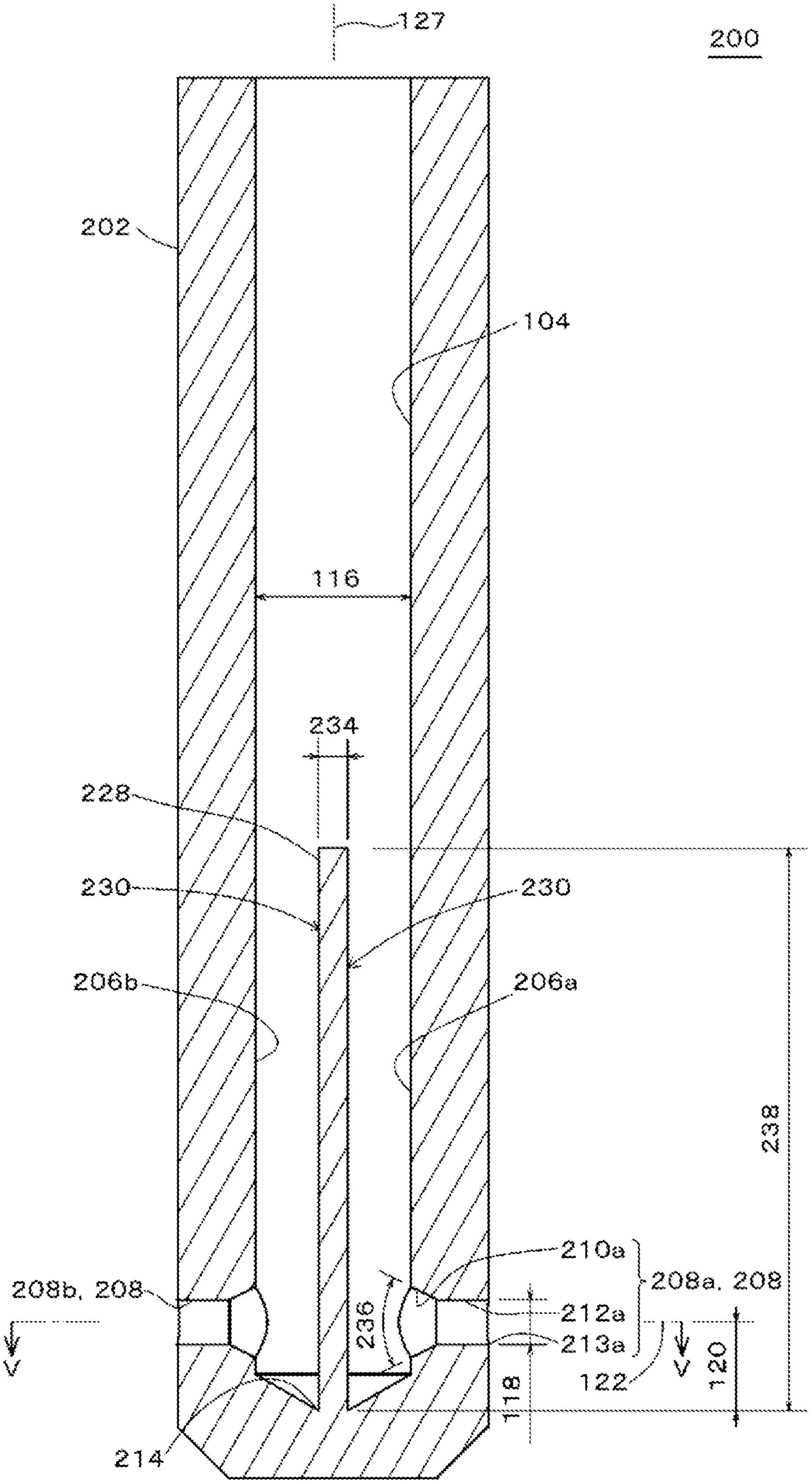
FIG. 4 is a longitudinal sectional view of the nozzle according to the second embodiment.
Figure 5:
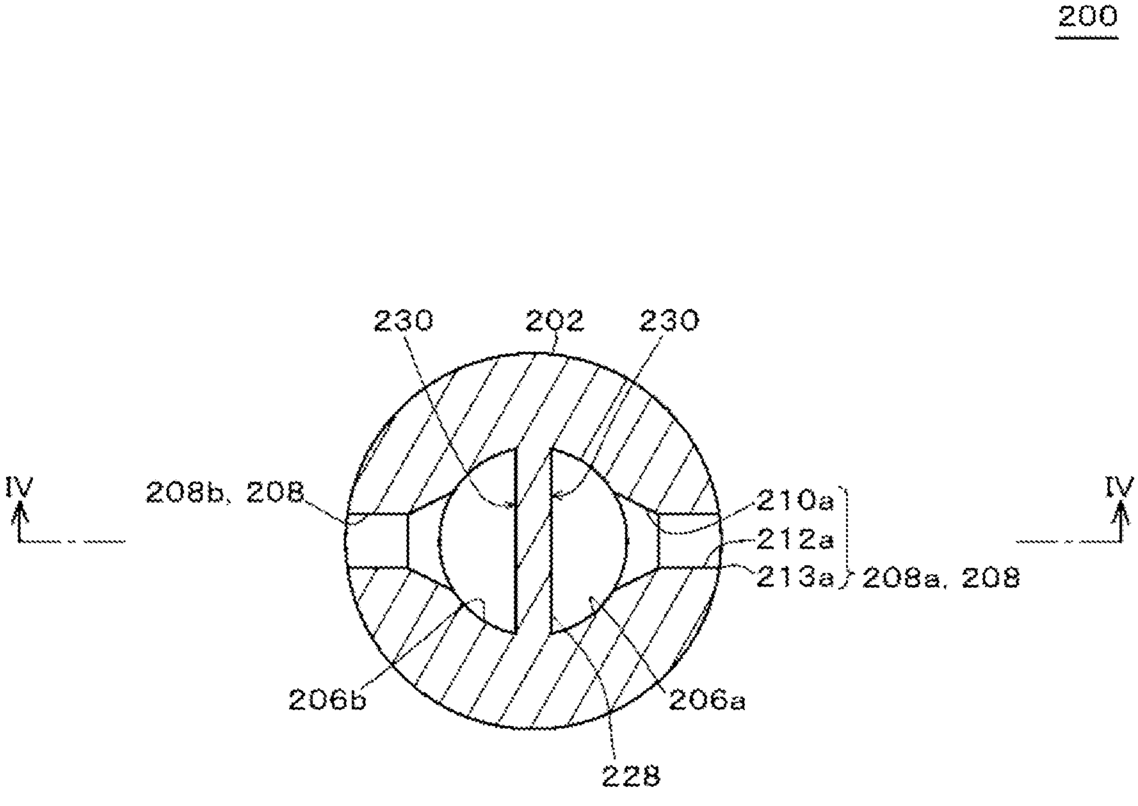
FIG. 5 is a V-V cross-sectional view in FIG. 4.

As shown in FIGS. 3, 4 and 5, the nozzle 200 according to the present embodiment includes a shaft body 202, a liquid guide path 104, a liquid chamber 206, a plate 228, and nozzle holes 208*a*, 208*b*.

The shaft body 202 extends along center axis 127. The shaft body 202 has a cylindrical shape. For example, the shaft body 202 has an outer diameter of 5 mm to 8 mm.

The liquid guide path 104 is located inside the shaft body 202.

The liquid chamber 206, which is disposed at the distal end of the liquid guide path 104, extends along the center axis 127. The liquid chamber 206 has a bottom portion 214.

The plate 228 extends from the bottom portion 214 along the center axis 127. The plate 228 is a column having a plane 230 extending along the center axis 127. The plate 228 partitions the liquid chamber 206 into a first liquid chamber 206*a* and a second liquid chamber 206*b*. Each plane 230 faces the first liquid chamber 206*a* and the second liquid chamber 206*b*, respectively. A plate length 238 is, for example, four times the opening diameter 118. A plate width 234 is, for example, one-sixth of a liquid chamber diameter 116. The first liquid chamber 206*a* and the second liquid chamber 206*b* are symmetrical with respect to the center axis 127. For example, the liquid chamber 206 has an inner diameter of 3 mm to 6 mm. The opening diameter 118 is 0.5 mm to 2.0 mm. The plate width 234 is 0.5 mm to 1 mm. The plate length 238 is 5 mm to 10 mm.

A nozzle hole (first nozzle hole) 208*a* is located at a distal end portion of the first liquid chamber 206*a*. The nozzle hole 208*a* has an inlet portion 210*a*. The inlet portion 210*a* is connected to the first liquid chamber 206*a*. The inlet portion 210*a* is a truncated cone having an apex angle 236. The apex angle 236 is, for example, 60 degrees.

A nozzle hole (second nozzle hole) 208*b* is located at a distal end portion of the second liquid chamber 206*b*. The nozzle hole 208*b* is substantially identical to the nozzle hole 208*a*.

The nozzle holes 208*a*, 208*b* each has a circular shape having a center at the ejection axis 122.

Since the plate 228 partitions the liquid chamber 206 into the first liquid chamber 206*a* and the second liquid chamber 206*b*, it is possible to suppress disturbance of the liquid in the liquid chamber caused by the liquid ejected from the nozzle holes 208*a*, 208*b* entraining the air in the nozzle holes 208*a*, 208*b*. As a result, turbulence of the liquid ejected from the nozzle holes 208*a*, 208*b* is suppressed to improve the linearity of the jet flow.

Third Embodiment

Figure 6:
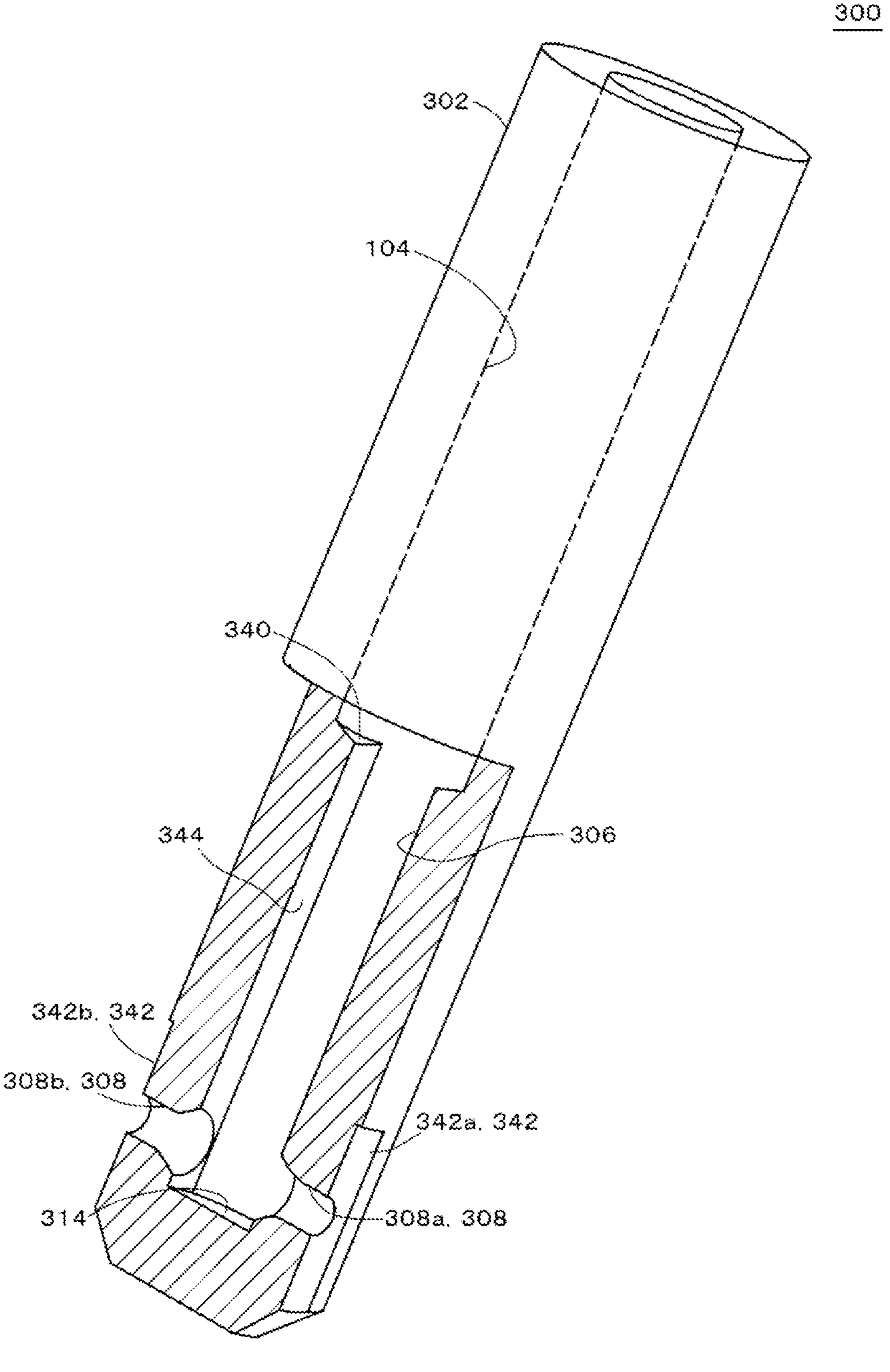
FIG. 6 is a partial cross-sectional perspective view of the nozzle according to the third embodiment.
Figure 7:
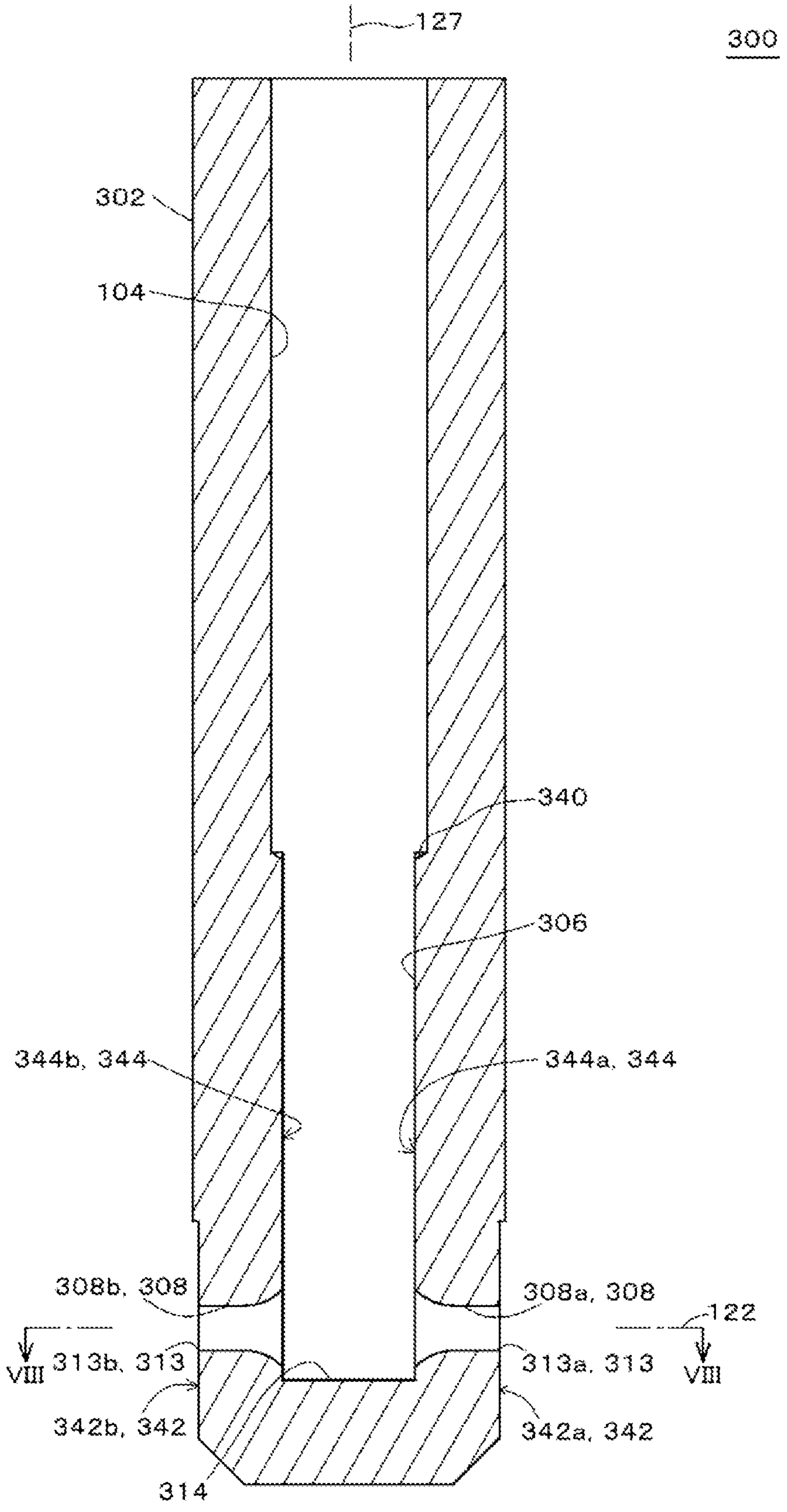
FIG. 7 is a longitudinal sectional view of the nozzle according to the third embodiment.
Figure 8:
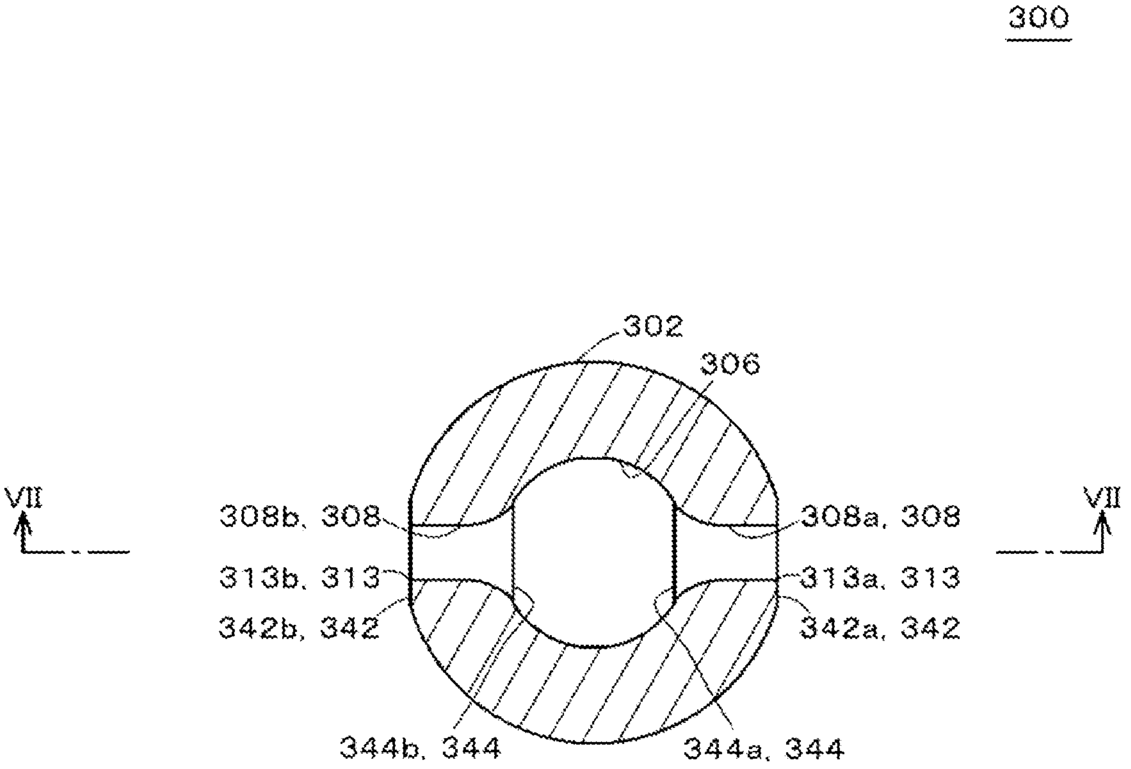
FIG. 8 is a VIII-VIII cross-sectional view in FIG. 7.

As shown in FIGS. 6, 7 and 8, the nozzle 300 according to the present embodiment includes a shaft body 302, a liquid guide path 104, a step 340, a liquid chamber 306, and nozzle holes 308*a*, 308*b*. The shaft body 302 extends along the center axis 127. The shaft body 302 has outlet planes 342*a*, 342*b*. The outlet planes 342*a*, 342*b* are cut out of the outer shape of the shaft body 302. The outlet planes 342*a*, 342*b* are symmetrical about the center axis 127. The outlet planes 342*a*, 342*b* are perpendicular to the ejection axis 122.

The liquid guide path 104 has a step 340. The step 340, which is disposed at a distal end of the liquid guide path 104, forms a part of the outer shape of the liquid guide path 104. The step 340 connects the liquid guide path 104 and the liquid chamber 306 so that the cross-sectional area decreases toward the downstream.

The liquid chamber 306, which is disposed at the distal end portion of the liquid guide path 104, extends along the center axis 127. The liquid chamber 306 has a bottom portion 314 and inlet planes 344*a*, 344*b*. The bottom portion 314 is planar. The inlet planes 344*a*, 344*b* connect to the step 340. The inlet planes 344*a*, 344*b* are symmetrical with respect to the center axis 127. The inlet planes 344*a*, 344*b* are perpendicular to the ejection axis 122.

The nozzle holes 308*a*, 308*b* are substantially identical to the nozzle holes 108. The upstream end of the nozzle hole 308*a* is connected to the inlet plane 344*a*. The downstream end of the nozzle hole 308*a* is connected to the outlet plane 342*a*.

The nozzle hole 308*b* is connected to the inlet plane 344*b* and the outlet plane 342*b*. The nozzle hole 308*b* is substantially identical to the nozzle hole 308*a*.

The outlet planes 342*a*, 342*b* make an amount of air entering from around the openings 313*a*, 313*b* uniform. Also, the inlet planes 344*a*, 344*b* and the outlet planes 342*a*, 342*b* equalize the axial length of the nozzle holes 308*a*, 308*b* in the circumferential direction. As a result, the turbulence of the liquid ejected from the nozzle holes 308*a*, 308*b* is suppressed to improve the linearity of the jet flow.

When the bottom portion 314 is configured as a flat surface, the streamlines of the liquid in the liquid chamber 306 are aligned. Therefore, the turbulence in the nozzle holes 308*a*, 308*b* is suppressed to improve the linearity of the jet flow.

It should be noted that the present invention is not limited to the embodiments described above, and various modifications can be made without departing from the gist of the present invention, and all technical matters included in the technical idea described in the claims are the target matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

100 Nozzle
102 Shaft body
104 Liquid guide path
106 Liquid chamber
108 Nozzle hole
110 Inlet portion
112 Guide portion
113 Opening

What is claimed is:

1. A nozzle, comprising:

a shaft body having a center axis;

a liquid guide path located inside the shaft body, the liquid guide path extending along the center axis;

a plurality of liquid chambers disposed at a distal end portion of the liquid guide path, each of the liquid chambers of said plurality of liquid chambers having a nozzle hole located at a distal end portion of the respective liquid chamber, the nozzle hole extending along an ejection axis that is different direction from the center axis, the nozzle hole having an inlet portion connected to the respective liquid chamber, the inlet portion having a smaller diameter toward the downstream, and a guide portion connected to the downstream of the inlet portion to guide liquid to an opening of the nozzle hole, the guide portion being cylindrical with a constant cross-sectional shape and cross-sectional area along its length from the downstream of the inlet portion to the opening of the nozzle hole.

2. The nozzle according to claim 1, wherein the inlet portion of each of the nozzle holes has a cross-section of curved convex toward radially inward.

3. The nozzle according to claim 2, wherein each of the plurality of liquid chambers has an inlet plane perpendicular to the ejection axis of the associated nozzle hole and the inlet portion of the associated nozzle hole is located on the respective inlet plane.

4. The nozzle according to claim 2, wherein for each of the nozzle holes associated with respective ones of the plurality of liquid chambers, the shaft body includes an outlet plane perpendicular to the ejection axis and the opening is located on the respective outlet plane.

5. The nozzle according to claim 1, wherein the inlet portion of each of the nozzle holes has a truncated conical shape.

6. The nozzle according to claim 5, wherein the inlet portion of each of the nozzle holes has an apex angle of 10 degrees to 60 degrees.

7. The nozzle according to claim 6, wherein each of the plurality of liquid chambers has an inlet plane perpendicular to the ejection axis of the associated nozzle hole and the inlet portion of the associated nozzle hole is located on the respective inlet plane.

8. The nozzle according to claim 5, wherein each of the plurality of liquid chambers has an inlet plane perpendicular to the ejection axis of the associated nozzle hole and the inlet portion of the associated nozzle hole is located on the respective inlet plane.

9. The nozzle according to claim 1, wherein each of the liquid chambers has an inlet plane perpendicular to the respective ejection axis and the respective nozzle-hole inlet portion is located on the inlet plane.

10. The nozzle according to claim 1, wherein for each of the nozzle holes associated with respective ones of the plurality of liquid chambers, the shaft body includes an outlet plane perpendicular to the ejection axis and the opening is located on the respective outlet plane.

11. The nozzle according to claim 1, wherein the shaft body is cylindrical and the nozzle holes extend perpendicularly to the center axis.

12. The nozzle according to claim 1, wherein the plurality of nozzle holes, each associated with a respective one of said plurality of liquid chambers, are circumferentially located at equal intervals.

13. The nozzle according to claim 1, further comprising a plate disposed at the distal end portion of the liquid guide path which partitions the distal end portion of the liquid guide path into the plurality of liquid chambers.

14. The nozzle according to claim 1, wherein a height of the ejection axis of a given nozzle hole from a bottom of the respective liquid chambers is 0.5 to 2 times a diameter of the opening of the given nozzle hole.

15. A nozzle, comprising:

a shaft body having a center axis;

a liquid guide path located inside the shaft body, the liquid guide path extending along the center axis;

a liquid chamber disposed at a distal end portion of the liquid guide path, the liquid chamber defining a void in the shape of a solid cylinder such that it fills with a solid-cylindrical portion of liquid and having a nozzle hole located at a distal end portion of the liquid chamber, the nozzle hole extending along an ejection axis that is different direction from the center axis, the nozzle hole having an inlet portion connected to the liquid chamber, the inlet portion having a smaller diameter toward the downstream, and a guide portion connected to the downstream of the inlet portion to guide liquid to an opening of the nozzle hole, the guide portion being cylindrical with a constant cross-sectional shape and cross-sectional area along its length from the downstream of the inlet portion to the opening of the nozzle hole, wherein the liquid chamber has a cylindrical shape.

* * * * *